United States Patent
Kim et al.

(10) Patent No.: US 10,912,047 B2
(45) Date of Patent: Feb. 2, 2021

(54) METHOD AND APPARATUS FOR TRANSMITTING AND RECEIVING SYSTEM INFORMATION

(71) Applicant: LG ELECTRONICS INC., Seoul (KR)

(72) Inventors: Youngsub Kim, Seoul (KR); Hyunsoo Ko, Seoul (KR); Sukhyon Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/370,692

(22) Filed: Mar. 29, 2019

(65) Prior Publication Data
US 2019/0306813 A1 Oct. 3, 2019

(30) Foreign Application Priority Data
Mar. 29, 2018 (KR) .................. 10-2018-0036282

(51) Int. Cl.
*H04W 56/00* (2009.01)
*H04W 84/04* (2009.01)
(52) U.S. Cl.
CPC ........ *H04W 56/001* (2013.01); *H04W 84/042* (2013.01)

(58) Field of Classification Search
CPC ........... H04W 56/001; H04W 56/0095; H04W 84/042
USPC .......................................... 370/350
See application file for complete search history.

(56) References Cited

U.S. PATENT DOCUMENTS

| | | | | |
|---|---|---|---|---|
| 2018/0167946 A1* | 6/2018 | Si | ........................... | H04L 1/0061 |
| 2018/0198648 A1* | 7/2018 | Sun | ....................... | H04J 11/0073 |
| 2018/0324623 A1* | 11/2018 | Jung | ..................... | H04W 48/10 |
| 2019/0069322 A1* | 2/2019 | Davydov | ............ | H04W 74/006 |
| 2019/0140880 A1* | 5/2019 | Li | .............................. | H04L 5/00 |
| 2019/0159226 A1* | 5/2019 | Ly | ........................ | H04L 5/0053 |
| 2019/0200307 A1* | 6/2019 | Si | ........................ | H04L 27/2605 |
| 2020/0154376 A1* | 5/2020 | Ko | ......................... | H04W 76/11 |
| 2020/0178253 A1* | 6/2020 | Gao | ...................... | H04W 72/04 |
| 2020/0213960 A1* | 7/2020 | Jung | ................. | H04W 72/1257 |
| 2020/0275392 A1* | 8/2020 | Tang | ................. | H04W 72/0493 |
| 2020/0275451 A1* | 8/2020 | Liu | ..................... | H04W 72/005 |

* cited by examiner

*Primary Examiner* — Candal Elpenord
(74) *Attorney, Agent, or Firm* — Lee, Hong, Degerman, Kang & Waimey

(57) ABSTRACT

A method of receiving remaining minimum system information (RMSI) by a user equipment (UE) in a wireless communication system is disclosed. The method includes receiving a synchronization signal/physical broadcast channel (SS/PBCH) block in a specific band, obtaining a size of a synchronization raster for the specific band based on the SS/PBCH block, and receiving the RMSI based on the size of the synchronization raster.

15 Claims, 13 Drawing Sheets

FIG. 1
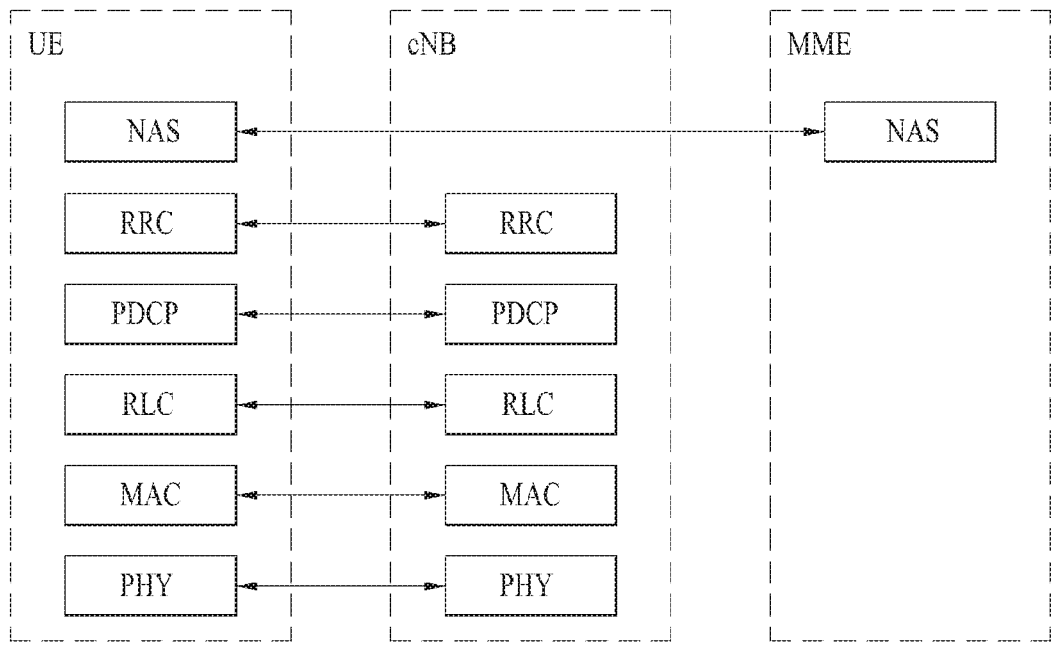
(A) CONTROL-PLANE PROTOCOL STACK
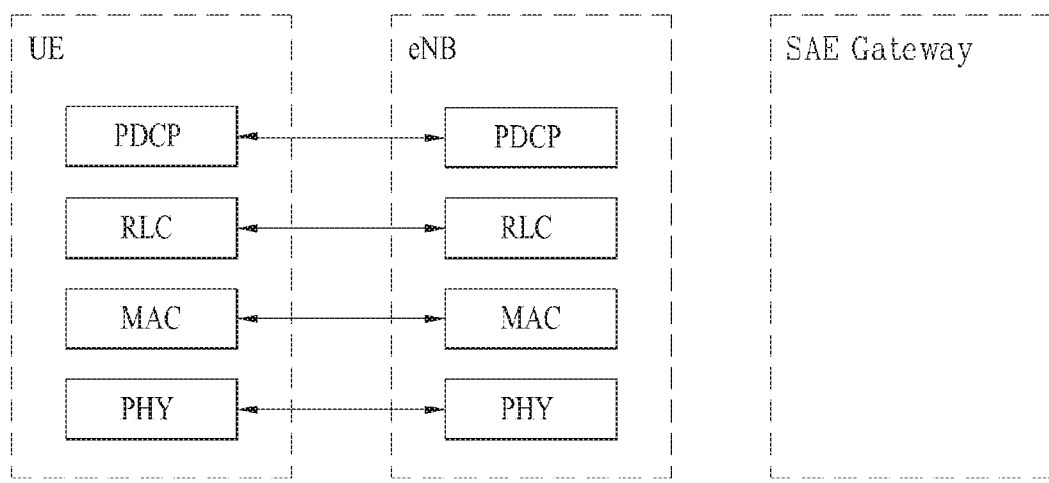
(B) USER-PLANE PROTOCOL STACK

METHOD AND APPARATUS FOR TRANSMITTING AND RECEIVING SYSTEM INFORMATION

CROSS-REFERENCE TO RELATED APPLICATION

Pursuant to 35 U.S.C. § 119(a), this application claims the benefit of earlier filing date and right of priority to Korean Patent Application No. 10-2018-0036282, filed on Mar. 29, 2019, the contents of which are hereby incorporated by reference herein in its entirety.

BACKGROUND OF THE INVENTION

Field of the Invention

The present disclosure relates to a method and apparatus for transmitting and receiving system information, and more particularly, to a method and apparatus for, when there are two or more synchronization (sync) raster sizes defined in an operating frequency band of a user equipment (UE), acquiring the size of a sync raster related to a received synchronization signal/physical broadcast channel (SS/PBCH) block received by the UE, and transmitting and receiving remaining minimum system information (RMSI) based on the size of the sync raster.

Discussion of the Related Art

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY OF THE INVENTION

Accordingly, the present disclosure is directed to a method and apparatus for transmitting and receiving system information, which substantially obviate one or more problems due to limitations and disadvantages of the related art.

An aspect of the present disclosure is to provide a method and apparatus for transmitting and receiving system information.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, a method of receiving remaining minimum system information (RMSI) by a user equipment (UE) in a wireless communication system includes receiving a synchronization signal/physical broadcast channel (SS/PBCH) block in a specific band, obtaining a size of a synchronization raster for the specific band based on the SS/PBCH block, and receiving the RMSI based on the size of the synchronization raster.

The size of the synchronization raster may be obtained based on PBCH contents included in the SS/PBCH block.

Further, the size of the synchronization raster may be obtained from a part of 3 bits used for an SS/PBCH block index included in the PBCH contents.

Further, the 3 bits may be reserved bits for the specific band.

Further, the size of the synchronization raster may be obtained based on a sequence related to the SS/PBCH block.

Further, the size of the synchronization raster may be obtained based on a scrambling sequence related to the SS/PBCH block.

Further, the size of the synchronization raster may be obtained based on a PBCH demodulation reference signal (DMRS) mapping pattern for the SS/PBCH block.

Further, the size of the synchronization raster may be determined to be a size of a synchronization raster assumed for detecting an RMSI control resource set (CORESET) based on an RMSI CORESET configuration included in PBCH contents, among a plurality of candidate synchronization raster sizes, and the PBCH contents may be included in the SS/PBCH block.

In another aspect of the present disclosure, an apparatus for receiving RMSI in a wireless communication system includes a memory, and at least one processor coupled with the memory. The at least one processor is configured to receive an SS/PBCH block in a specific band, to obtain a size of a synchronization raster for the specific band based on the SS/PBCH block, and to receive the RMSI based on the size of the synchronization raster.

The size of the synchronization raster may be obtained based on PBCH contents included in the SS/PBCH block.

Further, the size of the synchronization raster may be obtained from a part of 3 bits used for an SS/PBCH block index included in the PBCH contents.

Further, the 3 bits may be reserved bits for the specific band.

Further, the size of the synchronization raster may be obtained based on a sequence related to the SS/PBCH block.

Further, the size of the synchronization raster may be obtained based on a scrambling sequence related to the SS/PBCH block.

Further, the size of the synchronization raster may be obtained based on a PBCH demodulation reference signal (DMRS) mapping pattern for the SS/PBCH block.

Further, the size of the synchronization raster may be determined to be a size of a synchronization raster assumed for detecting an RMSI CORESET based on an RMSI CORESET configuration included in PBCH contents, among a plurality of candidate synchronization raster sizes, and the PBCH contents may be included in the SS/PBCH block.

In another aspect of the present disclosure, a method of transmitting RMSI by a base station (BS) in a wireless communication system includes transmitting an SS/PBCH block in a specific band, to indicate a size of a synchronization raster related to the specific band, and transmitting the RMSI based on the size of the synchronization raster.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 is a view illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard;

DETAILED DESCRIPTION OF THE INVENTION

Figure 2:
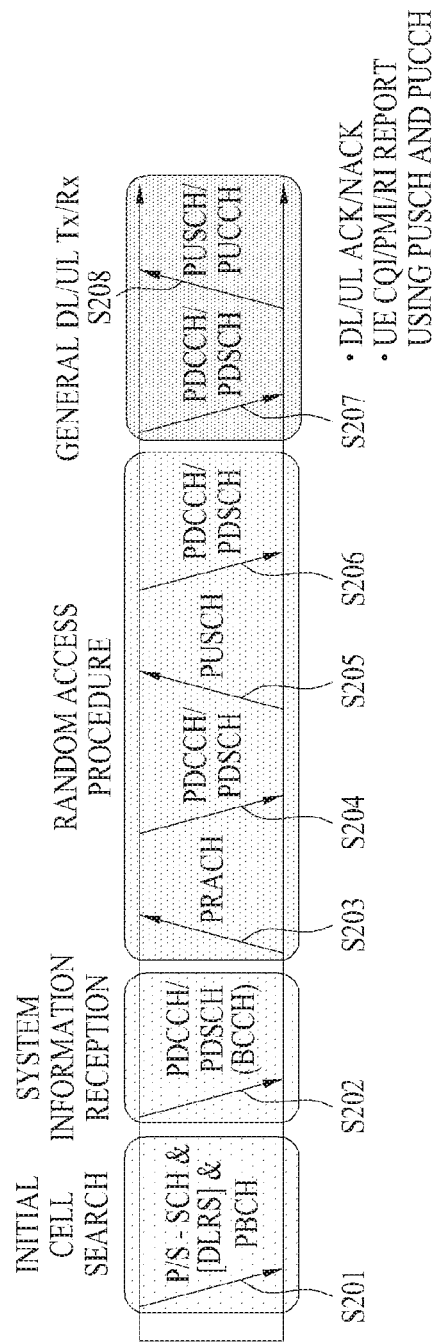
FIG. 2 is a view illustrating physical channels and a general signal transmission method using the physical channels in a 3GPP system.

Reference will now be made in detail to the preferred embodiments of the present disclosure, examples of which are illustrated in the accompanying drawings. Wherever possible, the same reference numbers will be used throughout the drawings to refer to the same or like parts.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
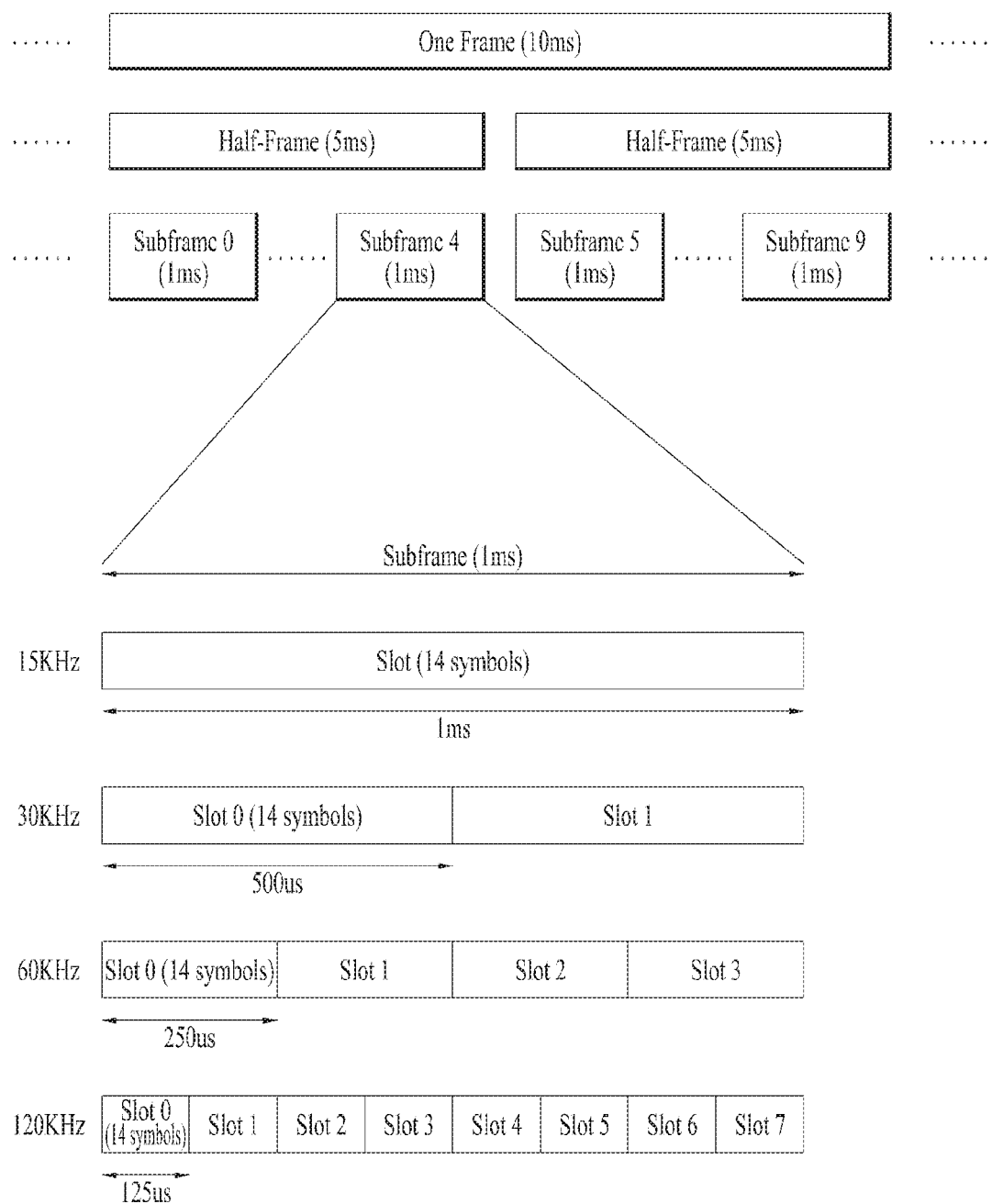
FIGS. 3 to 5 are views illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
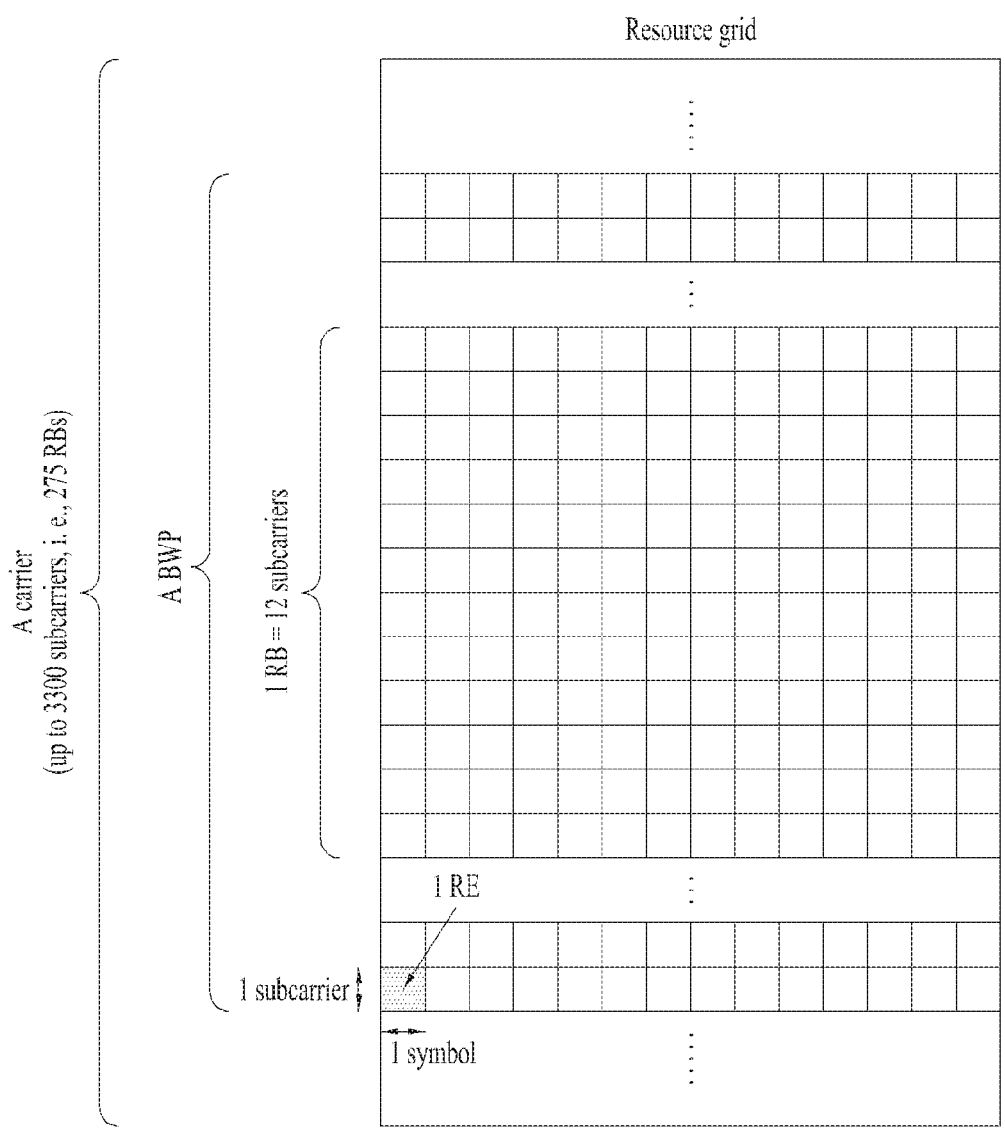

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
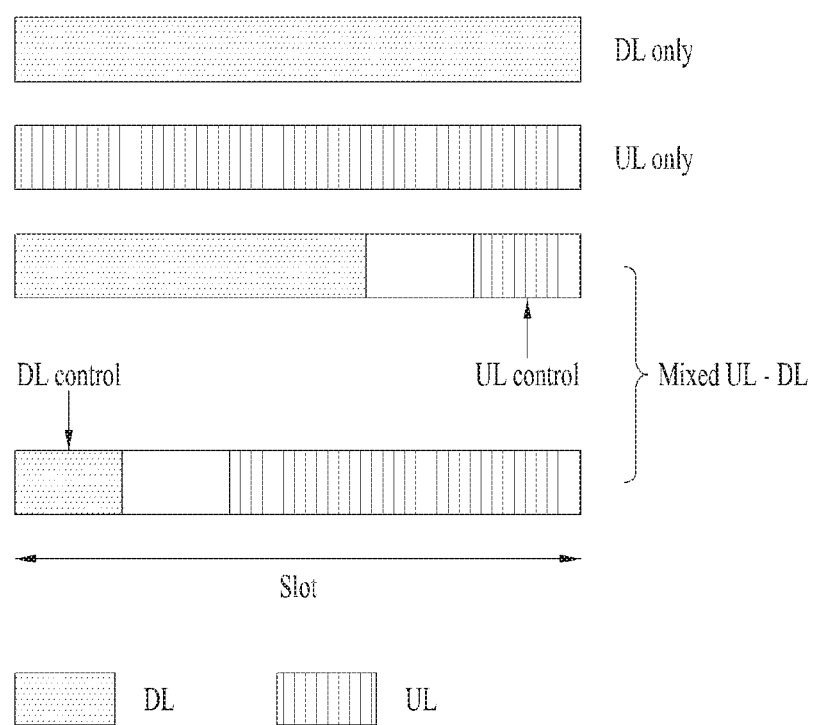

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.
 1. DL only configuration
 2. UL only configuration
 3. Mixed UL-DL configuration
  DL region+Guard period (GP)+UL control region
  DL control region+GP+UL region
   DL region: (i) DL data region, (ii) DL control region+ DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

For NR system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with a received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present invention to be described later are proposed in consideration of constraints resulting from the characteristics of analog BF or hybrid BF.

Figure 6:
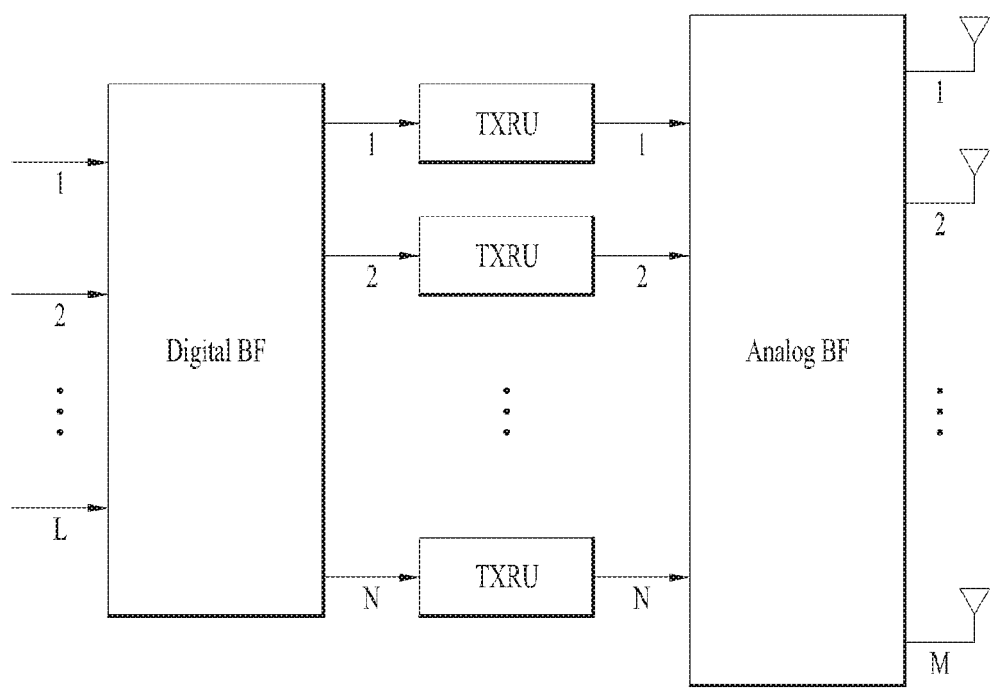
FIG. 6 is a view illustrating exemplary connection schemes between transceiver units (TXRUs) and antenna elements.

FIG. 6 abstractly illustrates a hybrid beamforming structure in terms of TXRUs and physical antennas.

Figure 8:
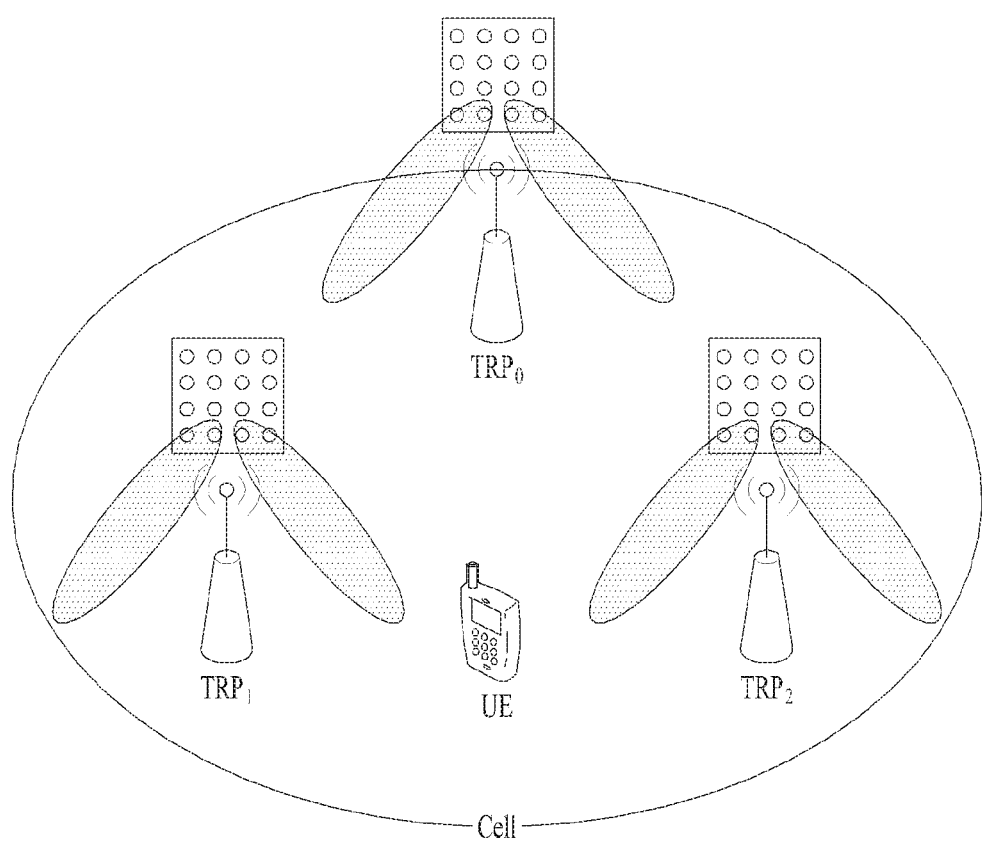
FIG. 8 is a view illustrating an exemplary cell in the NR system.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 8, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 7:
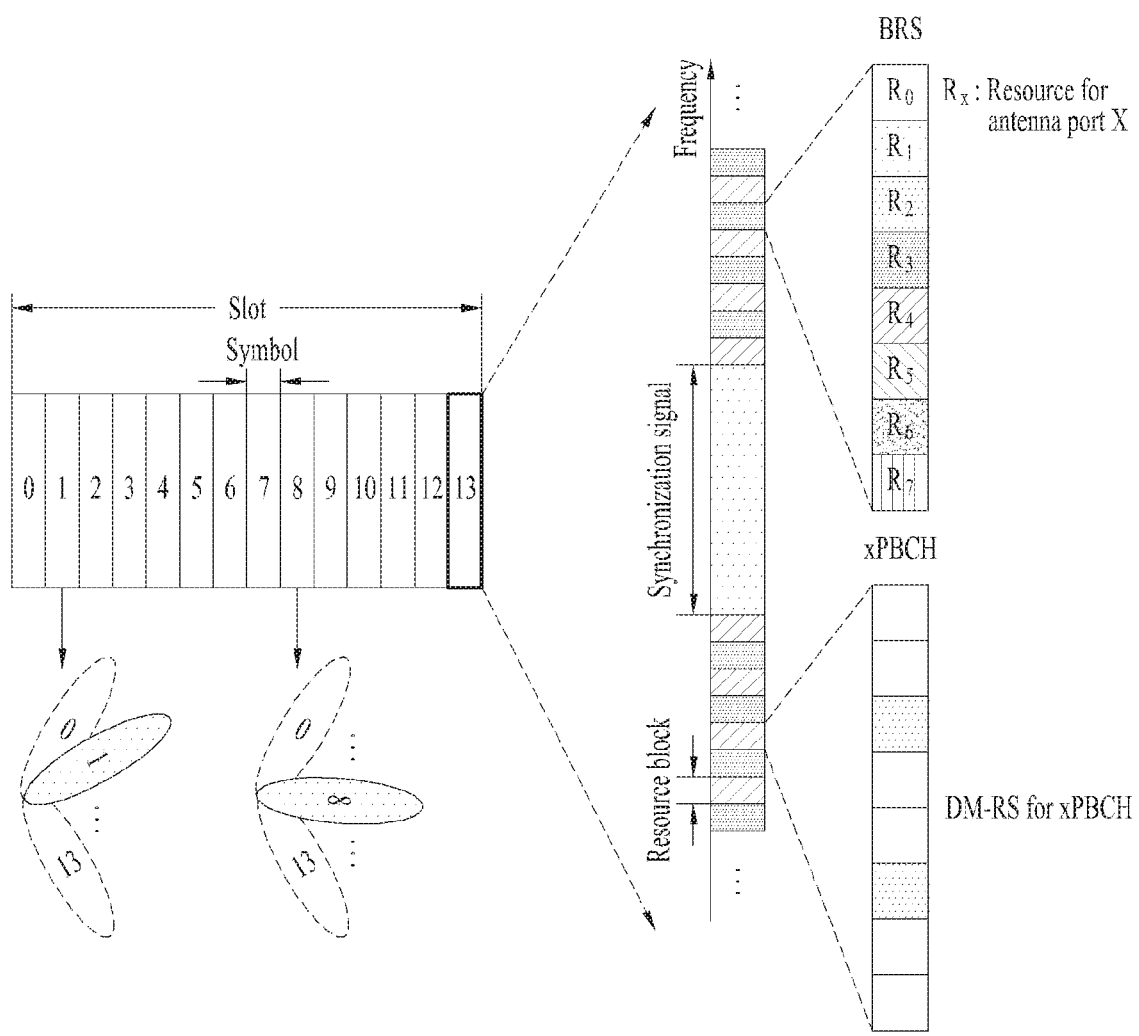
FIG. 7 is a view illustrating beam sweeping for a synchronization signal and system information during downlink (DL) transmission.
Figure 9:
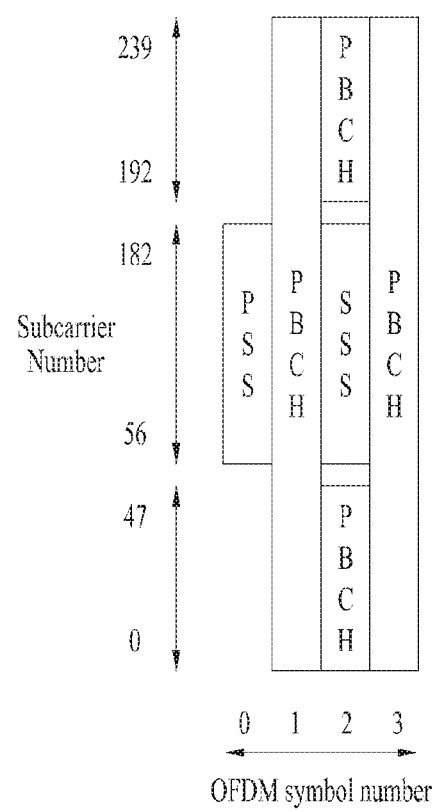
FIG. 9 is a view illustrating a structure of a synchronization signal/physical broadcast channel (SS/PBCH) block used in the NR system.

FIG. 7 is a view illustrating beam sweeping for an SS and system information during DL transmission. In FIG. 7, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 9 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

FIG. 8 is a view illustrating an exemplary cell in the NR system.

Referring to FIG. 8, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

FIG. 9 illustrates an SSB structure. The UE may perform cell search, system information acquisition, beam alignment for initial connection, DL measurement, etc. based on the SSB. The SSB is used interchangeably with the synchronization signal/physical broadcast channel (SS/PBCH) block.

Referring to FIG. 9, an SSB is composed of a PSS, a SSS and a PBCH. The SSB is composed of four consecutive OFDM symbols. The PSS, the PBCH, the SSS/PBCH and the PBCH are transmitted on each OFDM symbol, respectively. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH is composed of a data RE and a demodulation reference signal (DMRS) RE for each OFDM symbol. There are three DMRS REs per RB, and there are three data REs between the DMRS REs.

Cell search is a procedure in which a UE acquires time/frequency synchronization with a cell and detects a cell identifier (ID) (e.g., physical layer cell ID (PCID)) of the cell. The PSS is used to detect a cell ID in a cell ID group, and the SSS is used to detect the cell ID group. The PBCH is used to detect an SSB (time) index and a half-frame.

The cell search procedure of the UE may be summarized below.

TABLE 3

| | Type of Signals | Operations |
|---|---|---|
| 1$^{st}$ step | PSS | * SS/PBCH block (SSB) symbol timing acquisition<br>* Cell ID detection within a cell ID group (3 hypotheses) |
| 2$^{nd}$ Step | SSS | * Cell ID group detection (336 hypotheses) |
| 3$^{rd}$ Step | PBCH DMRS | * SSB index and Half frame (HF) index (Slot and frame boundary detection) |
| 4$^{th}$ Step | PBCH | * Time information (80 ms, System Frame Number (SFN), SSB index, HF)<br>* Remaining Minimum System Information (RMSI) Control resource set (CORESET)/Search space configuration |
| 5$^{th}$ Step | PDCCH and PDSCH | * Cell access information<br>* RACH configuration |

There are 336 cell ID groups each including 3 cell IDs. A total of 1008 cell IDs exist and are defined according to [Equation 1].

$$N_{ID}^{cell}=3N_{ID}^{(1)}+N_{ID}^{(2)} \text{ where } N_{ID}^{(1)}\in\{0,1,\ldots,335\} \text{ and } N_{ID}^{(2)}\in\{0,1,2\}.$$ [Equation 1]

where $N^{cell}_{ID}$ represents a cell ID (e.g., PCID). $N^{(1)}_{ID}$ represents a cell ID group, which is provided/acquired through the SSS. $N^{(2)}_{ID}$ represents a cell ID in a cell ID group, which is provided/acquired through the PSS.

A PSS sequence $d_{PSS}(n)$ may be defined to satisfy [Equation 2].

$$d_{PSS}(n)=1-2x(m)$$

$$m=(n+43N_{ID}^{(2)})\bmod 127$$

$$0\le n<127$$ [Equation 2]

where $x(i+7)=(x(i+4)+x(i))\bmod 2$ and $[x(6)\ x(5)\ x(4)\ x(3)\ x(2)\ x(1)\ x(0)]=[1\ 1\ 1\ 0\ 1\ 1\ 0]$.

An SSS sequence $d_{SSS}(n)$ may be defined to satisfy [Equation 3].

$$d_{SSS}(n) = [1 - 2x_0((n + m_0)\bmod 127)]$$
$$[1 - 2x_1((n + m_1)\bmod 127)]$$

$$m_0 = 15\left\lfloor\frac{N_{ID}^{(1)}}{112}\right\rfloor + 5N_{ID}^{(2)}$$

$$m_1 = N_{ID}^{(1)}\bmod 112$$

$$0 \le n < 127$$

where $$x_0(i+7) = (x_0(i+4) + x_0(i))\bmod 2$$

$$x_1(i+7) = (x_1(i+4) + x_1(i))\bmod 2$$

and $$[x_0(6)\ x_0(5)\ x_0(4)\ x_0(3)\ x_0(2)\ x_0(1)\ x_0(0)] =$$
$$[0\ 0\ 0\ 0\ 0\ 0\ 1]$$
$$[x_1(6)\ x_1(5)\ x_1(4)\ x_1(3)\ x_1(2)\ x_1(1)\ x_1(0)] =$$
$$[0\ 0\ 0\ 0\ 0\ 0\ 1]$$
[Equation 3]

Figure 10:
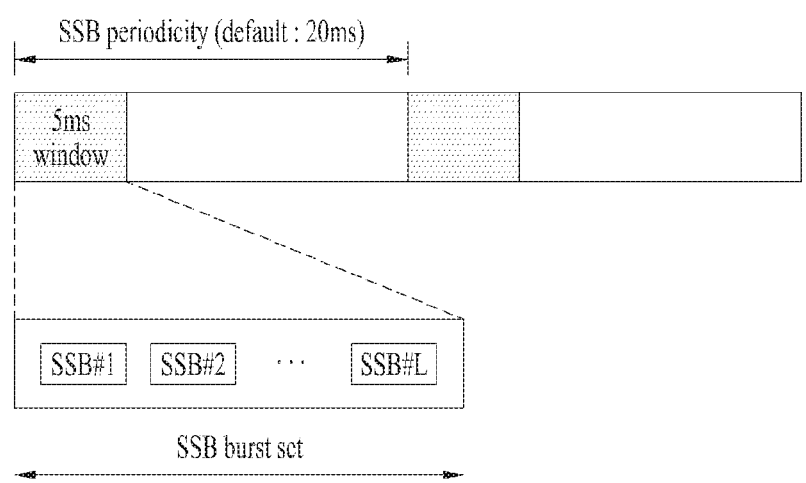
FIG. 10 is a view illustrating transmission of an SS/PBCH block in the NR system.

FIG. 10 illustrates exemplary SSB transmission. Referring to FIG. 10, the SSB is transmitted periodically with an SSB periodicity. A default SSB periodicity that a UE assumes during initial cell search is defined as 20 ms. After cell access, the SSB periodicity may be set to one of {5 ms, 10 ms, 20 ms, 40 ms, 80 ms, 160 ms} by a network (e.g., eNB). An SSB burst set is configured at the start of an SSB period. The SSB burst set includes a 5-ms time window (i.e., a half-frame), and the SSB may be transmitted up to L times within the SS burst set. The maximum transmission number L of the SSB may be given as follows according to the frequency band of a carrier. One slot includes up to two SSBs.

For a frequency range up to GHz, L=4
For a frequency range from 3 GHz to 6 GHz, L=8
For a frequency range from 6 GHz to 52.6 GHz, L=64

The time positions of SSB candidates in the SS burst set may be defined as follows according to SCSs. The time positions of the SSB candidates are indexed from 0 to L−1 (SSB indexes) in a time order in the SSB burst set (i.e., half-frame).

Case A with 15 kHz SCS: The starting symbols of the SSB candidates are given as {2, 8}+14*n. If a carrier frequency is 3 GHz or below, n=0, 1. If the carrier frequency ranges from 3 GHz to 6 GHz, n=0, 1, 2, 3.

Case B with 30 kHz SCS: The starting symbols of the SSB candidates are given as {4, 8, 16, 20}+28*n. If the carrier frequency is 3 GHz or below, n=0. If the carrier frequency ranges from 3 GHz to 6 GHz, n=0, 1.

Case C with 30 kHz SCS: The starting symbols of the SSB candidates are given as {2, 8}+14*n. If the carrier frequency is 3 GHz or below, n=0, 1. If the carrier frequency ranges from 3 GHz to 6 GHz, n=0, 1, 2, 3.

Case D with 120 kHz SCS: The starting symbols of the SSB candidates are given as {4, 8, 16, 20}+28*n. If the carrier frequency is above 6 GHz, n=0, 1, 2, 3, 5, 6, 7, 8, 10, 11, 12, 13, 15, 16, 17, 18.

Case E with 240 kHz SCS: The starting symbols of the SSB candidates are given as {8, 12, 16, 20, 32, 36, 40, 44}+56*n. If the carrier frequency is above 6 GHz, n=0, 1, 2, 3, 5, 6, 7, 8.

Figure 11:
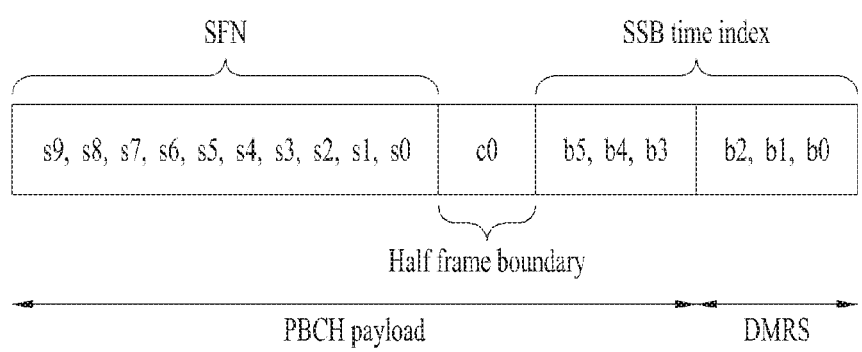
FIG. 11 is a view illustrating a method of transmitting information about DL time synchronization in the NR system.

FIG. 11 illustrates exemplary acquisition of information about DL time synchronization at a UE. Referring to FIG. 11, the UE may acquire DL synchronization by detecting an SSB. The UE may identify the structure of an SSB burst set based on the index of the detected SSB, and thus detect a symbol/slot/half-frame boundary. The number of a frame/half-frame to which the detected SSB belongs may be identified by SFN information and half-frame indication information.

Specifically, the UE may acquire 10-bit SFN information, s0 to s9 from a PBCH. 6 bits of the 10-bit SFN information is acquired from a master information block (MIB), and the remaining 4 bits is acquired from a PBCH transport block (TB).

Subsequently, the UE may acquire 1-bit half-frame indication information c0. If a carrier frequency is 3GH or below, the half-frame indication information may be signaled implicitly by a PBCH DMRS. The PBCH DMRS indicates 3-bit information by using one of 8 PBCH DMRS sequences. Therefore, if L=4, the remaining one bit except for two bits indicating an SSB index in the 3-bit information which may be indicated by 8 PBCH DMRS sequences may be used for half-frame indication.

Finally, the UE may acquire an SSB index based on the DMRS sequence and the PBCH payload. SSB candidates are indexed from 0 to L−1 in a time order within an SSB burst set (i.e., half-frame). If L=8 or 64, three least significant bits (LSBs) b0 to b2 of the SSB index may be indicated by 8 different PBCH DMRS sequences. If L=64, three most significant bits (MSBs) b3 to b5 of the SSB index is indicated by the PBCH. If L=2, two LSBs b0 and b1 of an SSB index may be indicated by 4 different PBCH DMRS sequences. If L=4, the remaining one bit b2 except for two bits indicating an SSB index in 3-bit information which may be indicated by 8 PBCH DMRS sequences may be used for half-frame indication.

The NR system adopts OFDM or a similar transmission scheme. The NR system may use OFDM parameters different from the OFDM parameters used in LTE. Alternatively or additionally, the NR system may have a larger system bandwidth (e.g., 100 MHz) than the legacy LTE/LTE-A system, although it still adopts a numerology used in the legacy LTE/LTE-A system. Alternatively or additionally, one cell may support a plurality of numerologies. That is, UEs operating with different numerologies may co-exist within one cell.

Now, a method of transmitting and receiving information about the size of a synchronization (sync) raster according to the present disclosure will be described below in detail.

According to the present disclosure, a description will be given of a method of indicating whether the size of a sync raster corresponding to an SS/PBCH block, which has been received by a UE in a frequency range in which a band with a sync raster of 900 kHz overlaps with a band with a sync raster of 1.44 MHz, is 900 kHz or 1.44 MHz in an NR system.

A sync raster is the distance between frequencies in which a synchronization signal, that is, an SS/PBCH block may be transmitted in the frequency domain. In the current NR, the 900 kHz sync raster and the 1.44 MHz sync raster are defined according to frequency ranges. Bands with the 900 kHz sync raster exist in a frequency range of 0 to 2700 MHz, and bands with the 1.44 MHz sync raster exist in a frequency range of 2400 to 24250 MHz.

However, according to the above-defined bands and sync raster sizes, the 900 kHz sync raster and the 1.44 MHz sync raster co-exist in the frequency range of 2400 to 2700 MHz.

Specifically, information about sync rasters and bands are defined in [Table 4] and [Table 5] according to the NR standard specification 38.101-1.

TABLE 4

| Frequency range | SS Block frequency position $SS_{REF}$ | GSCN | Range of GSCN |
|---|---|---|---|
| 0-2700 MHz | N * 900 kHz + M * [TBD 70-100 kHz] N = 1:3000, M = −1:1 | 3N + M − 1 | 1-[8999] |
| 2400-24250 MHz | 2400 MHz + N * 1.44 MHz N = 0:15173 | [9000 + N] | [9000-24173] |

TABLE 5

| NR Operating Band | SS Block SCS | SS Block pattern[1] | Range of GSCN (First-<Step size>-Last) |
|---|---|---|---|
| n1 | 15 kHz | Case A | [7039-<1>-7224] |
| n2 | 15 kHz | Case A | [6439-<1>-6624] |
| n3 | 15 kHz | Case A | [6022-<1>-6258] |
| n5 | 15 kHz | Case A | [2902-<1>-2973] |
|  | 30 kHz | Case B | [2911-<1>-2964] |
| n7 | 15 kHz | Case A | [8734-<1>-8958] |
| n8 | 15 kHz | Case A | [3091-<1>-3192] |
| n20 | 15 kHz | Case A | [2644-<1>-2727] |
| n28 | 15 kHz | Case A | [2533-<1>-2677] |
| n38 | 15 kHz | Case A | [8572-<1>-8958] |
| n41 | 15 kHz | Case A | [9069-<3>-9198] |
|  | 30 kHz | Case C | [9070-<1>-9198] |
| n50 | 15 kHz | Case A | [4780-<1>-5049] |
| n51 | 15 kHz | Case A | [4762-<1>-4764] |
| n66 | 15 kHz | Case A | [7039-<1>-[7326] |
|  | 30 kHz | Case B | [7048-<1>-[7317] |
| n70 | 15 kHz | Case A | [6655-<1>-[6726] |
| n71 | 15 kHz | Case A | [2062-<1>-2166] |
| n74 | 15 kHz | Case A | [4924-<1>-5052] |
| n75 | 15 kHz | Case A | [4780-<1>-5049] |
| n76 | 15 kHz | Case A | [4762-<1>-4764] |
| n77 | 30 kHz | Case C | [9628-<1>-10247] |
| n78 | 30 kHz | Case C | [9428-<1>-9969] |
| n79 | 30 kHz | Case C | [10400-<16>-10800] |

NOTE 1:
SS Block pattern is defined in section 4.1 in [TS 38.213]

Referring to [Table 4] and [Table 5], a frequency range per band may be calculated. The calculation reveals that a band with the 900 kHz sync raster overlaps with a band with the 1.44 MHz sync raster in two cases: bands {n4, n41} and {n38, n41}. Specifically, n7 has a frequency range between 2620.8 and 2687.4 MHz, n38 has a frequency range between 2572.2 and 2687.4 MHz, and n41 has a frequency range between 2499.36 and 2685.12 MHz. Therefore, {n7, n41} overlap with each other over the frequency range between 2620.8 and 2685.12 MHz, and {n38, n41} overlap with each other over the frequency range between 2572.2 and 2685.12 MHz.

For a band with the 900 kHz sync raster, there is an adjacent sync raster in an offset range of ±[70-100], and a carrier frequency offset (CFO) exists within the offset range. Accordingly, if a frequency accessed by the UE during initial access is in the overlap between two bands, ambiguity occurs to the size of a sync raster for the band accessed by the UE. For example, if the UE accesses a band with the 1.44 MHz sync raster that the UE takes for a band with the 900 kHz sync raster, a problem occurs to an operation of the UE.

Further, if the UE is aware from a No RMSI indication of a PBCH that there is no remaining minimum system information (RMSI) related to a corresponding SS/PBCH block, the UE may receive an indication of the position of a sync raster with RMSI or obtain information about a frequency range without RMSI, from RMSI-PDCCH-Config (8 bits) of the PBCH. However, only when the UE knows an accurate sync raster size, the UE may correctly interpret the information obtainable from RMSI-PDCCH-Config (8 bits).

Specifically, once the UE determines that there is no RMSI related to the SS/PBCH block, the UE receives an indication of an offset with which to locate a sync raster with RMSI by RMSI-PDCCH-Config (8 bits). Upon acquisition of the offset, the UE moves by a frequency value corresponding to (offset*size of sync raster in corresponding band), and receives an SS/PBCH block with RMSI.

In this case, however, if the size of the sync raster is ambiguous, the UE may not perform an efficient operation such as moving to the position of the sync raster with RMSI based on the indicated information or performing initial access by skipping a frequency range without RMSI.

Further, in the presence of the RMSI related to the SS/PBCH block, the UE may acquire the frequency-domain position of an RMSI control resource set (CORESET) and a search space by using RMSI-PDCCH-Config (8 bits).

In the NR standard specification 38.213, a plurality of tables are defined to acquire the frequency-domain position of an RMSI CORESET, and it is necessary to apply different tables according to sync raster sizes. In this case, without knowledge of its operating band and the size of a sync raster for the operating band, the UE may suffer from ambiguity as to which one to be used from among the tables defined in the standard specification 38.213, thereby causing a problem to an operation of the UE.

In this context, according to the present disclosure, a method of indicating the size of a sync raster to a UE will be described in order to overcome the ambiguity present in a sync raster size, in the case where a band with the 900 kHz sync raster overlaps with a band with 1.44 MHz sync raster.

Figure 12:
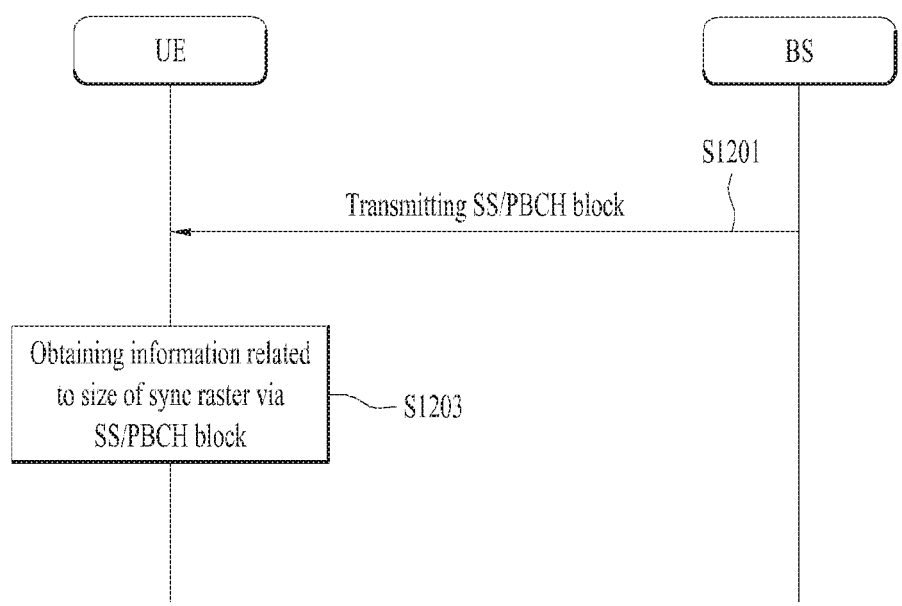
FIG. 12 is a diagram illustrating a signal flow for an operation of a network according to an embodiment of the present disclosure.

FIG. 12 is a diagram illustrating a signal flow for a method of indicating the size of a sync raster according to the present disclosure. Referring to FIG. 12, a BS transmits an SS/PBCH block in a specific band to a UE, and the UE receives the SS/PBCH block (S1201). The UE then acquires the size of a sync raster for the specific band based on the received SS/PBCH block (S1203).

Specifically, the BS may indicate the size of the sync raster in reserved bits of PBCH contents. That is, the BS may indicate whether the size of the sync raster for the operating band of the UE is 900 kHz or 1.44 MHz by one bit of the reserved bits. Herein, one of three reserved bits used to indicate an SS/PBCH block index may be used. In other words, since the bands which may overlap with each other, {n7, n41} and {n38, n41} are included in frequency range 1 (FR1) below 6 GHz, three bits included in PBCH contents to indicate three MSBs of an SS/PBCH block index transmitted in frequency range 2 (FR2) are not used in the bands {n7, n41} and {n38, n41}. Therefore, the three bits included in the PBCH contents to indicate the three MSBs of the SS/PBCH index are reserved in FR1, and thus the size of the sync raster may be indicated by one of these three bits. Then the UE may acquire the size of the sync raster by the one bit.

In another method, different SS/PBCH block configurations may be defined for the 900 kHz sync raster and the 1.44 MHz sync raster in a standard specification. For example, an SS/PBCH block with the 900 kHz sync raster and an SS/PBCH block with the 1.44 MHz sync raster may be differentiated in terms of sequence, scrambling, and/or PBCH demodulation reference signal (DMRS) mapping scheme. Then the UE may identify the size of a sync raster related to a received SS/PBCH block based on the sequence, scrambling, and/or PBCH DMRS mapping pattern of the SS/PBCH block.

Herein, the sequence of an SS/PBCH block refers to a sequence related to the SS/PBCH block, which may be the sequence of a PBCH DMRS, the sequence of a PSS included in the SS/PBCH block, and/or the sequence of an SSS included in the SS/PBCH block.

Further, the scrambling of an SS/PBCH block refers to a scrambling sequence related to the SS/PBCH block, which may be a sequence used to scramble PBCH contents. Further, A PBCH DMRS mapping scheme may refer to an interval and/or a pattern in which a DMRS is mapped.

The UE may assume that both of the 900 kHz sync raster and the 1.44 MHz sync raster are available in an overlapped band. For example, the UE may interpret an RMSI CORESET configuration included in the PBCH contents and detect an RMSI CORESET, on the assumption of the 900 kHz sync raster, and at the same time, interpret the RMSI CORESET configuration included in the PBCH contents and detect the RMSI CORESET, on the assumption of the 1.44 MHz sync raster. Since the sync raster is one of 900 kHz and 1.44 MHz, the RMSI CORESET may be detected only in one of the two cases. In this manner, the UE may acquire the size of the sync raster.

Once the UE acquires the size of the sync raster for the operating band of the UE in the above-described manner, the UE may receive RMSI based on the acquired sync raster size. That is, if the presence of RMSI corresponding to the received SS/PBCH block is determined based on RMSI-PDCCH-Config (8 bits), which one is to be used from among the plurality of tables defined to acquire the frequency-domain position of an RMSI CORESET in the NR standard specification 38.213 may be determined.

On the contrary, if the absence of RMSI corresponding to the received SS/PBCH block is determined based on RMSI-PDCCH-Config (8 bits), the RMSI may be acquired by receiving an SS/PBCH block with the RMSI based on a value obtained by multiplying the size of the sync raster by an offset value acquired from at least a part of the 8 bits of RMSI-PDCCH-Config based on the size of the sync raster.

Figure 13:
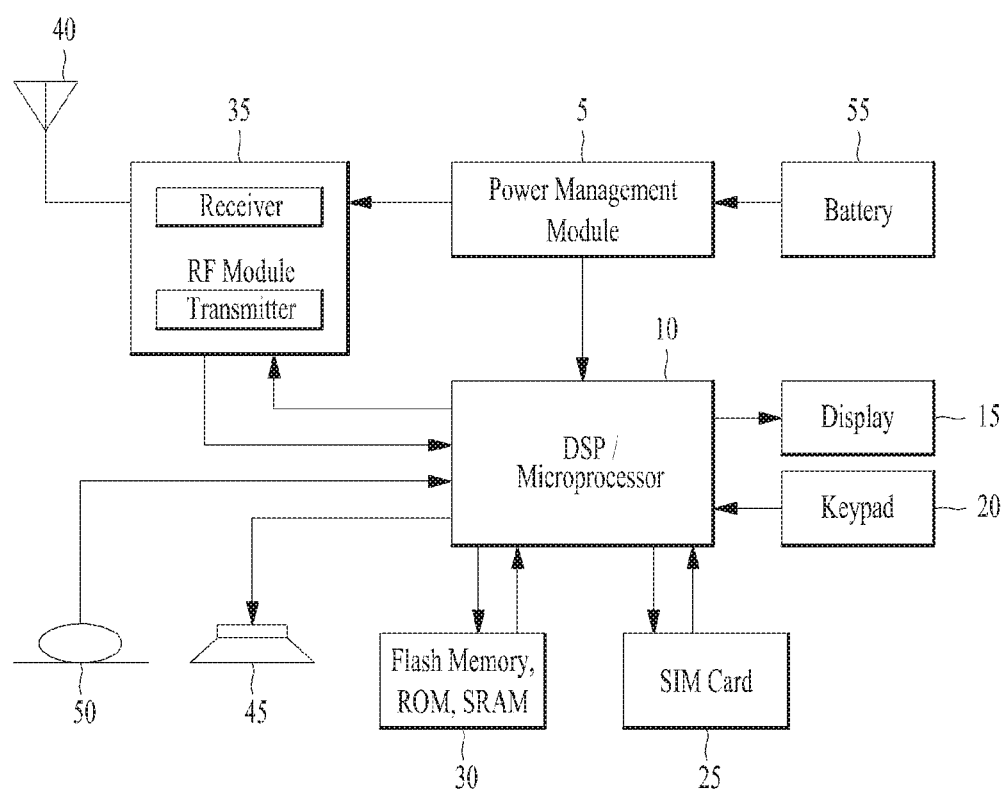
FIG. 13 is a block diagram illustrating components of a wireless apparatus for implementing the present disclosure.

FIG. 13 is a block diagram of an embodiment of a wireless communication apparatus according to an embodiment of the present disclosure.

The wireless communication apparatus described with reference to FIG. 13 may be a UE and/or a BS according to an embodiment of the present disclosure. However, the wireless communication apparatus illustrated in FIG. 13 may be replaced with various devices such as a vehicle communication system or device, a wearable device, a laptop computer, a smartphone, and so on, not limited to the UE and/or the BS according to the embodiment of the present disclosure.

Referring to FIG. 13, the UE and/or the BS according to the embodiment of the present disclosure may include at least one processor 10 such as a digital signal processor (DSP) or a microprocessor, a transceiver 35, a power management module 5, an antenna 40, a battery 55, a display 15, a keypad 20, a memory 30, a subscriber identification module (SIM) card 25, a speaker 45, and a microphone 50. Further, the UE and/or the BS may include a single or multiple antennas. The transceiver 35 may also be called a radio frequency (RF) module.

The processor 10 may be configured to implement the functions, procedures, and/or methods described before with reference to FIGS. 1 to 12. In at least a part of the embodiments described in FIGS. 1 to 12, the processor 10 may implement one or more protocols such as radio interface protocol layers (e.g., functional layers).

The memory 30 stores information related to an operation of the processor 10, in connection to the processor 10. The memory 30 may reside inside or outside of the processor 10, and may be connected to the processor 10 in various manners such as by wired communication or wireless communication.

A user may input various types of information (e.g., indication information such as a phone number) in various manners such as button pressing or voice activation based on the microphone 50. The processor 10 receives and/or processes user information and executes appropriate functions such as phone number dialing.

Further, to execute the appropriate functions, the processor 10 may search data (e.g., manipulation data) in the SIM card 25 or the memory 30. Further, the processor 10 may acquire information about the location of the UE and/or the BS through vehicle navigation, a map service, and so on or execute a function related to the location information, by receiving and processing global positioning system (GPS) information through a GPS chip. Further, the processor 10 may display those various types of information and data on the display 15, for reference and user convenience.

The transceiver 35 transmits and/or receives a wireless signal such as an RF signal, in connection to the processor 10. The processor 10 may start communication, and control the transceiver 35 to transmit a wireless signal including various types of information or data, such as voice communication data. The transceiver 35 may include a receiver that receives a wireless signal, and a transmitter that transmits a wireless signal. The antenna 40 facilitates transmission and reception of wireless signals. In some embodiments, upon receipt of a wireless signal, the transceiver 35 may forward and convert the signals to baseband frequency for processing in the processor 10. The processed signal may be processed by various techniques, for example, converted to audible or readable information and output through the speaker 45.

In some embodiments, a sensor may also be connected to the processor 10. The sensor may include one or more sensing devices configured to detect various types of information including a speed, an acceleration, light, vibration, and so on. The processor 10 may receive and process sensor information acquired from the sensor, such as proximity, location, and image, thereby executing various functions such as collision avoidance, autonomous driving, and so on.

The UE and/or the BS may further include many other components such as a camera and a universal serial bus (USB) port. For example, a camera may further be connected to the processor 10, and used in a wide range of services including autonomous driving, vehicle safety service, and so on.

The above-described components of the UE and/or the BS illustrated in FIG. 13 are merely an embodiment, which should not be construed as limiting the present disclosure.

For example, some components such as the keypad 20, the GPS chip, the sensor, the speaker 45, and/or the microphone 50 may be excluded for implementation of the UE and/or the BS in some embodiments.

Specifically, to implement the embodiments of the present disclosure, an operation of the wireless communication apparatus illustrated in FIG. 13 will be described below with the appreciation that the wireless communication apparatus is a UE. If the wireless communication apparatus is a UE according to an embodiment of the present disclosure, the processor 10 may control the transceiver 35 to receive an SS/PBCH block transmitted in a specific band by a BS, acquire the size of a sync raster for the specific band based on the received SS/PBCH block, and control the transceiver 35 to receive RMSI based on the acquired sync raster size. A specific method of acquiring the size of the sync raster for the specific band by the UE may be performed according to the specific embodiments described with reference to FIGS. 1 to 12.

To implement the embodiments of the present disclosure, if the wireless communication apparatus illustrated in FIG. 13 is a BS according to an embodiment of the present disclosure, the processor 10 may control the transceiver 35 to transmit an SS/PBCH block in a specific band to a UE. According to the specific embodiments described with reference to FIGS. 1 to 12, the processor 10 may indicate the size of a sync raster for the specific band to the UE, and control the transceiver 35 to transmit RMSI based on the sync raster size.

As is apparent from the foregoing description, according to the present disclosure, a UE may effectively acquire the size of a sync raster for an operating band of the UE in a frequency range in which a plurality of frequency bands with different sizes of sync rasters overlap with each other. Therefore, RMSI may effectively be transmitted and received based on the sync raster.

While the method and apparatus for transmitting and receiving system information have been described above in the context of a 5G NR system, they are also applicable to various wireless communication systems other than the 5G NR system.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present disclosure may be achieved by various means, for example, hardware, firmware, software, or a combination thereof. In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of receiving remaining minimum system information (RMSI) by a user equipment (UE) in a wireless communication system, the method comprising:
   receiving a synchronization signal/physical broadcast channel (SS/PBCH) block in a specific band;
   obtaining a size of a synchronization raster for the specific band based on the SS/PBCH block; and
   receiving the RMSI based on the size of the synchronization raster,
   wherein the size of the synchronization raster is one of 900 kHz or 1.44 MHz,
   wherein the size of the synchronization raster is obtained based on a mapping interval of a PBCH demodulation reference signal (DMRS) configured for the SS/PBCH block,
   wherein a first mapping interval of the PBCH DMRS for the SS/PBCH block is configured when the SS/PBCH block has the 900 kHz synchronization raster, and a second mapping interval of the PBCH DMRS for the SS/PBCH block is configured when the SS/PBCH block has the 1.44 MHz synchronization raster, and
   wherein the first mapping interval is different from the second mapping interval.

2. The method according to claim 1, wherein the size of the synchronization raster is obtained based on PBCH contents included in the SS/PBCH block.

3. The method according to claim 2, wherein the size of the synchronization raster is obtained from a part of 3 bits used for an SS/PBCH block index included in the PBCH contents.

4. The method according to claim 3, wherein the 3 bits are reserved bits for the specific band.

5. The method according to claim 1, wherein the size of the synchronization raster is obtained based on a sequence related to the SS/PBCH block.

6. The method according to claim 1, wherein the size of the synchronization raster is obtained based on a scrambling sequence related to the SS/PBCH block.

7. The method according to claim 1, wherein the size of the synchronization raster is determined to be a size of a synchronization raster assumed for detecting an RMSI control resource set (CORESET) based on an RMSI CORESET configuration included in PBCH contents, among a plurality of candidate synchronization raster sizes, and
   wherein the PBCH contents are included in the SS/PBCH block.

8. An apparatus for receiving remaining minimum system information (RMSI) in a wireless communication system, the apparatus comprising:
   a memory; and
   at least one processor coupled with the memory,
   wherein the at least one processor is configured to:
   receive a synchronization signal/physical broadcast channel (SS/PBCH) block in a specific band,
   obtain a size of a synchronization raster for the specific band based on the SS/PBCH block, and
   receive the RMSI based on the size of the synchronization raster,
   wherein the size of the synchronization raster is one of 900 kHz or 1.44 MHz,
   wherein the size of the synchronization raster is obtained based on a mapping interval of a PBCH demodulation reference signal (DMRS) configured for the SS/PBCH block,
   wherein a first mapping interval of the PBCH DMRS for the SS/PBCH block is configured when the SS/PBCH block has the 900 kHz synchronization raster, and a second mapping interval of the PBCH DMRS for the SS/PBCH block is configured when the SS/PBCH block has the 1.44 MHz synchronization raster, and
   wherein the first mapping interval is different from the second mapping interval.

9. The apparatus according to claim 8, wherein the size of the synchronization raster is obtained based on PBCH contents included in the SS/PBCH block.

10. The apparatus according to claim 9, wherein the size of the synchronization raster is obtained from a part of 3 bits used for an SS/PBCH block index included in the PBCH contents.

11. The apparatus according to claim 10, wherein the 3 bits are reserved bits for the specific band.

12. The apparatus according to claim 8, wherein the size of the synchronization raster is obtained based on a sequence related to the SS/PBCH block.

13. The apparatus according to claim 8, wherein the size of the synchronization raster is obtained based on a scrambling sequence related to the SS/PBCH block.

14. The apparatus according to claim 8, wherein the size of the synchronization raster is determined to be a size of a synchronization raster assumed for detecting an RMSI control resource set (CORESET) based on an RMSI CORESET configuration included in PBCH contents, among a plurality of candidate synchronization raster sizes, and
   wherein the PBCH contents are included in the SS/PBCH block.

15. A method of transmitting remaining minimum system information (RMSI) by a base station (BS) in a wireless communication system, the method comprising:
   transmitting a synchronization signal/physical broadcast channel (SS/PBCH) block in a specific band, to indicate a size of a synchronization raster related to the specific band; and
   transmitting the RMSI based on the size of the synchronization raster, wherein the size of the synchronization raster is one of 900 kHz or 1.44 MHz, wherein the size of the synchronization raster is indicated based on a mapping interval of a PBCH demodulation reference signal (DMRS) configured for the SS/PBCH block, wherein a first mapping interval of the PBCH DMRS for the SS/PBCH block is configured when the SS/PBCH block has the 900 kHz synchronization raster, and a second mapping interval of the PBCH DMRS for the SS/PBCH block is configured when the SS/PBCH block has the 1.44 MHz synchronization raster, and wherein the first mapping interval is different from the second mapping interval.

* * * * *